(12) United States Patent
Rinot (10) Patent No.: US 6,356,773 B1
(45) Date of Patent: Mar. 12, 2002

(54) RADIATION SHIELDING DEVICE

(76) Inventor: Eyal Rinot, 21 Hatichon Street, Savyon 56300 (IL)

( * ) Notice: Subject to any disclaimer, the term of this patent is extended or adjusted under 35 U.S.C. 154(b) by 0 days.

(21) Appl. No.: 09/350,046

(22) Filed: Jul. 8, 1999

(51) Int. Cl.[7] .............................. H04B 1/38; H04Q 1/12
(52) U.S. Cl. ...................... 455/568; 455/575; 455/562; 343/718; 2/171
(58) Field of Search ................... 455/575, 550, 455/562, 568, 569, 90, 128, 129; 379/430, 433; 250/515.1, 505.1, 506.1; 343/718, 702; D14/137, 138, 140

(56) References Cited

U.S. PATENT DOCUMENTS

| | | | |
|---|---|---|---|
| 4,357,711 A | * 11/1982 | Drefko et al. .............. 455/575 |
| 5,335,366 A | 8/1994 | Daniels ........................ 455/89 |
| 5,338,896 A | 8/1994 | Danforth ................... 174/35 R |
| 5,438,702 A | * 8/1995 | Jackson ...................... 455/575 |
| 5,444,866 A | 8/1995 | Cykiert ......................... 455/89 |
| 5,513,383 A | * 4/1996 | Tsao ............................ 455/575 |
| 5,541,609 A | * 7/1996 | Stutzman et al. ........... 343/702 |
| 5,550,552 A | * 8/1996 | Oxley ......................... 343/702 |
| 5,613,221 A | * 3/1997 | Hunt ........................... 455/450 |
| 5,657,386 A | 8/1997 | Schwanke ................... 379/433 |
| 5,854,970 A | * 12/1998 | Kivela .......................... 455/90 |
| 5,995,854 A | * 11/1999 | Wilson ....................... 455/575 |
| 6,009,563 A | * 1/2000 | Swanson et al. ............... 2/425 |

* cited by examiner

Primary Examiner—Dwayne Bost
Assistant Examiner—Erika A. Gary
(74) Attorney, Agent, or Firm—Lowe Hauptman Gilman & Berner, LLP (57) ABSTRACT

Antenna apparatus connects to a personal radio transmitting device for reducing RF emissions to a user, with the antenna apparatus including an antenna disposed above the head of the user, a shield disposed between the antenna and the head of the user, for blocking the RF emissions from penetrating therethrough toward the user, and a communication interface, connected to the antenna, for communicating between the antenna apparatus and the personal radio transmitting device.

56 Claims, 10 Drawing Sheets

RADIATION SHIELDING DEVICE

FIELD OF THE INVENTION

The present invention relates to portable radio transceiver and cellular telephones in general, and particularly to arrangements designed to reduce the electromagnetic field strength to which the user of such radios and telephones is normally exposed to.

BACKGROUND OF THE INVENTION

A radio transceiver transmits radio signals, in the form of electromagnetic radiation, at predetermined frequencies. It will be appreciated by those skilled in the art that such radiation may inflict biological alterations on living tissues. Serious questions have arisen regarding the safety of users exposed to the cellular telephone electromagnetic wave radiation. Therefore, there is an urgent need to provide means for protecting users of portable transceivers in general and cellular telephone, in particular, from allegedly harmful exposure to the electromagnetic wave radiation.

Figure 1:
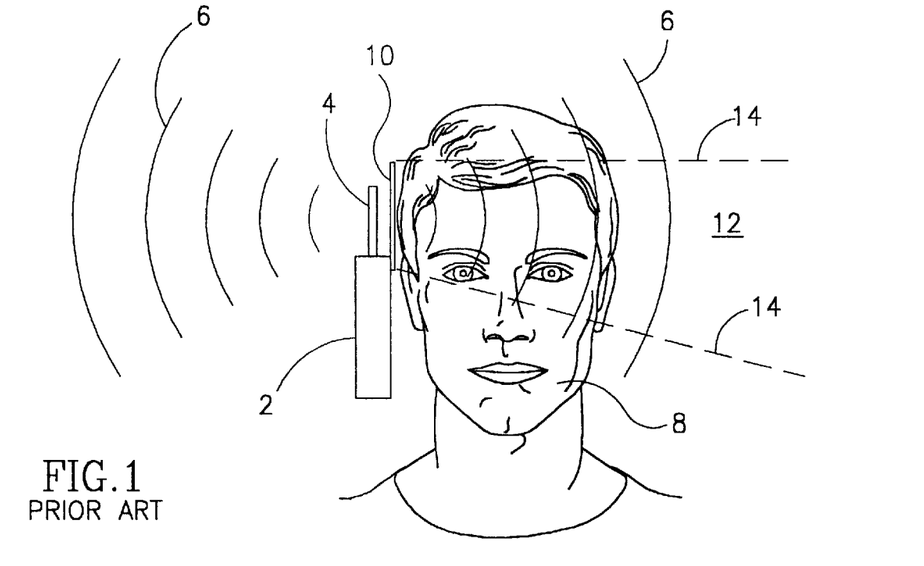
FIG. 1 is a schematic illustration of an electromagnetic field generated by an antenna of a conventional cellular telephone, as is known in the art.

Reference is now made to FIG. 1, which is a schematic illustration of an electromagnetic field generated by an antenna of a conventional cellular phone 2, as is known in the art. Antenna 4, of conventional cellular telephone 2, produces electromagnetic wave radiation, which is generally represented by field lines 6. The dissipated radiation penetrates the head and other parts of the body of the user 8.

There are known examples in the prior art confronting the issue of exposure to electromagnetic radiation, especially concerning cellular telephones. For instance, U.S. Pat. No. 5,657,386 to Schawnke entitled "Electromagnetic Shield for Cellular Telephone"; U.S. Pat. No. 5,444,866 to Cykiert entitled "Device for Shielding a Cellular Telephone User from Electromagnetic Wavesw"; U.S. Pat. No. 5,335,366 to Daniels entitled "Radiation Shielding Apparatus for a Radio Transmitting Device"; and, U.S. Pat. No. 5,338,896 to Danforth entitled "Shield Device for Cellular Phones", teach such examples. These examples invariably employ a radiation shield in a specific form or made of a specific material. Such a shield is designed to be disposed between the transmitting antenna of the hand held telephone and the head of the user.

However, as shown in FIG. 1, shield 10 can block only a portion of the radiation, represented by space 12, that is delineated between perforated lines 14. Direct emission, directed outside spaces 12, still penetrate the body of the user. Therefore, the partial shielding of the radiation when the cellular telephone is used in proximity of the head, leaves significant radiation unblocked. Furthermore, the shield and the body of the user also blocks or absorbs part of the transmitting and receiving radiation. Hence, attenuating the intensity of the received or transmitted signal and reducing the quality of communication.

Furthermore, in some cellular telephones, the antenna is generally placed inside the hand-held telephone housing, and therefore the electromagnetic waves radiate through the hand of the user. If the antenna is shielded all around, and not only in direction of the head, the quality of transmission and receiving deteriorates considerably.

SUMMARY OF THE INVENTION

It is an object of the present invention to provide a novel antenna apparatus for protecting the user against electromagnetic radiation generated by the antenna of a portable radio or a cellular telephone. It is a further object of the present invention to provide a communication device, which is easy to use, and has a low manufacturing cost.

There is thus provided according to the invention a novel antenna apparatus for connecting to a personal radio transmitting device for reducing RF emissions to a user, including an antenna disposed above the head of the user, a shield disposed between the antenna and the head of the user, for blocking RF emissions from penetrating there through toward the user, and a communication interface, connected to the antenna, for communicating between the antenna apparatus and the radio transmitting device. The antenna apparatus may further comprise antenna support for supporting the antenna above the head of the user. According to one embodiment, the antenna support comprise a support rod suitable for mounting to the personal radio device, the antenna is mounted atop the support rod, the shield may be mounted atop the support rod below the antenna, and the shield may be is substantially extended sideways.

According to another preferable embodiment the antenna is mounted on the shield. In accordance with yet another embodiment the antenna apparatus further includes shield support for supporting the shield between the head of the user and the antenna. The shield support may comprise any of the list consisting of a headset, a hat, a helmet, a harness, a hairpin, a hairpiece, a spectacle frame, and a visor. The antenna may be shaped as a rod, a pyramid, a cone, a curved plane, or a flat plane. The shield may be substantially convex, concave, or flat. The shield may also comprise an integral part of a helmet, a hat, a cap or a yarmulke.

The communication interface may comprise a wired or a wireless communication between the antenna apparatus and the radio-transmitting device. Wireless communication may comprise infrared, RF, or ultra-sound communication.

The antenna apparatus may further comprise a radio communication component, connected to the antenna, for transmitting or reception of radio transmissions conducted via the antenna. Preferably, the communication component is disposed adjacent to the antenna. Further preferably, the antenna apparatus further includes a power source for supplying power to the radio communication component and preferably disposed adjacent thereto. The radio communication component may comprise a transmitter, a receiver or a transceiver. Still, further preferably, the antenna apparatus further includes a processor, connected to the radio communication component and to the communication interface, for controlling the radio communication component, the processor being preferably disposed adjacent to the communication component.

In accordance with yet another preferable embodiment of the invention, the antenna apparatus may further comprise user interface in communication with the processor. The user interface may optionally comprise audio interface, visual interface, tactile interface, or any combination thereof. The visual interface may comprise a display screen. The tactile interface may comprise a keypad or a touch-screen. The audio interface may comprise a microphone or an earphone or both. Either wired or wireless communication connects the user interface to the processor. The wireless communication may comprise infrared, RF, or ultra-sound communication.

In accordance with yet a further embodiment of the invention, the antenna apparatus may further comprise a communication component, a power supply for the communication component, a processor for controlling the communication component, and user interface, all of which are disposed in a hand-held housing designed to be immediately adjacent to the head of the user while in operation.

Still, according to a further embodiment of the invention, the antenna apparatus further includes visual indication, for indicating to people in the vicinity of the user, the operational state of the communication device, namely—the being of the antenna apparatus in use, in standby mode or turned off.

According to another feature of the invention there is provided a personal communication device including a transmitter, a processor, connected to the transmitter, for controlling the transmitter, an antenna, connected to the transmitter, disposed above the head of the user, a shield disposed between the antenna and the head of the user for blocking RF radiation, and communication interface for connecting the antenna to the transmitter, wherein, in response to the processor, the transmitter generates, via the communication interface, the antenna to emits RF radiation, and the shield prevents such radiation from penetrating there through toward the user. All the features mentioned above with respect to the antenna apparatus can be optionally employed in conjunction with the personal communication device.

BRIEF DESCRIPTION OF THE INVENTION

The present invention will be understood and appreciated more fully from the following detailed description taken in conjunction with drawings in which:

FIGS. 11A, 11B, 11C, 11D, 11E, 11F and 11G illustrate several items incorporating a shield and providing for attachment to the user head, which are constructed and operative in accordance with preferred embodiments of the present invention.

FIGS. 12A, 12B, 12C, 12D, and 12E, illustrate, in a perspective view, several antennas constructed and operative in conjunction with preferred embodiments of the present invention.

FIGS. 14A, 14B and 14C, illustrating, in perspective view, three shields constructed and operative in conjunction with preferred embodiments of the present invention.

DETAILED DESCRIPTION OF THE INVENTION

The detailed description of the invention is generally applicable to mobile or hand held radios, portable wireless telephones and other wireless personal communication devices. In particular, the description is concerned with any personal communication device, which employs a transmitter generating electromagnetic radiation. For convenience purposes only, the term "cellular telephone" shall refer herein below to all such personal communication devices generating RF emissions.

The present invention overcomes the disadvantages of the prior art by positioning the transmitting antenna element, on or above the head of the user, and placing a shield between the antenna and the head. The shield blocks the penetration of radiation there through, thereby substantially insulating the head from the antenna.

It will be appreciated by those vested in the art, that the intensity I of the emitted radiation generally diminishes in inverse proportion to the square of the distance R from the radiating source, whereby I 1/R$^2$.

The present invention is directed to placing the radiation-emitting antenna as far as possible from the user. Nevertheless, the distancing of any parts of the cellular telephone from the body of the user may impair the compactness and comfortable use of the telephone. The present invention provides for alternative embodiments that retain compactness and comfort despite the disposition of an active antenna element on or above the user's head.

It is noted that the principals outlined in accordance with the present invention can be implemented in personal communication device or as supplemental unit to such a personal communication device, as will be apparent from the description presented herein below.

Figure 2:
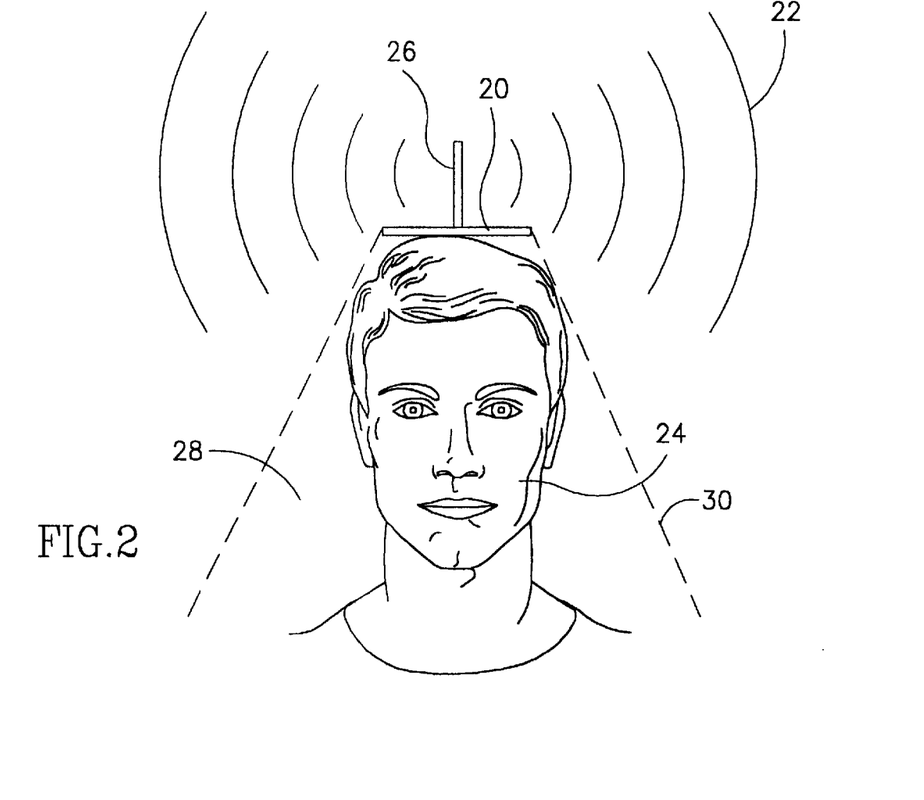
FIG. 2 is an illustration of user, and a combination of an antenna and a shield, constructed and operative in accordance with a preferred embodiment of the present invention.

Reference is now made to FIG. 2, which is an illustration of user, and a combination of an antenna and a shield, constructed and operative in accordance with a preferred embodiment of the present invention. Antenna 26 emits electromagnetic radiation (generally referenced 22). FIG. 2 illustrates how a shield 20 of the invention, substantially blocks the electromagnetic radiation, which is directed towards the head of the user 24. It is noted that shield 20 protects the head 24 against most of the powerful direct radiation 22, emitted by antenna 26. The shield 20 determines a volume 28 (delineated by perforated lines 30), which is substantially clear of direct radiation originated at the antenna 26.

It will be appreciated that the shorter antenna 26 is, the closer antenna 26 is to shield 20, and the broader shield 20 is, the larger and more effective is the shaded or shielded space 28. It will be noted in this context that antenna 26 may be horizontal or flat shaped, as will be described herein below in conjunction with FIGS. 12D and 12E.

Shield 20 is made from materials, which either reflect or absorb electromagnetic radiation. For example, such reflective material can be various conductive metals and alloys, and the like. It is noted that the general structure of the shield can include a base and a shielding layer or other shielding elements, wither attached to the base or embedded therein.

The upper surface of shield 20 is RF reflective so that no substantial RF radiation passes there through. According to another aspect of the invention, shield 20 may be fabricated from radiation absorbent materials that also block the radiation, and tend to dissipate heat. The specific selection or combination of materials may be chosen according to specific requirements, provided by the designer.

The electromagnetic radiation reflected from shield 20 could create interference when interacted with the electromagnetic radiation directly originating from antenna 26. It is possible to roughen the reflective surface of shield 20 or render it rugged or with diffusing surface, thereby reducing coherent reflections of rays, and diminishing the probability of substantial interference.

Figure 3:
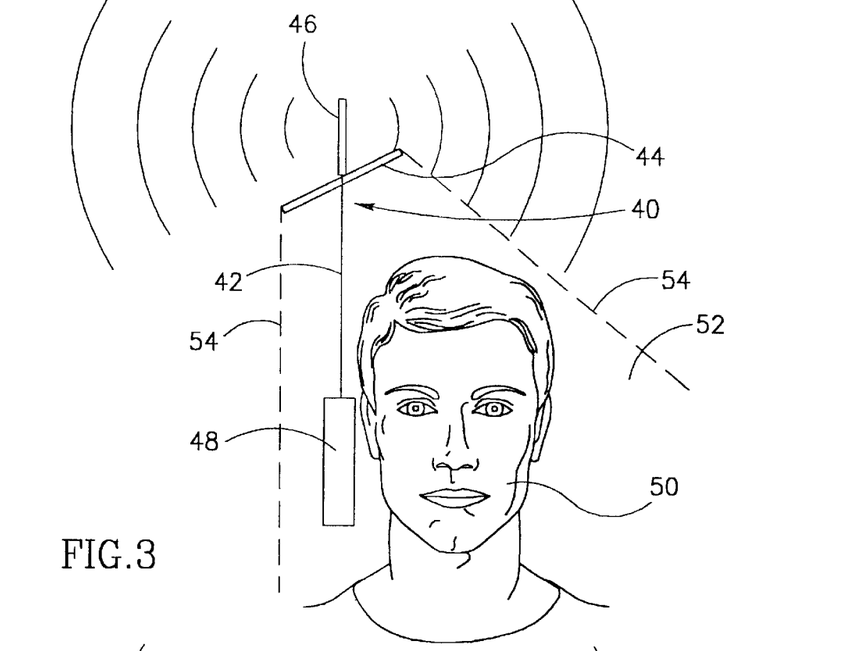
FIG. 3 is an illustration of a user head and a cellular device and an antenna assembly, constructed and operative in accordance with a further preferred embodiment of the invention.

Reference is now made to FIG. 3, which is an illustration of a user head, and a cellular device, generally referenced 48 and an antenna assembly, generally referenced 40, constructed and operative in accordance with a further preferred embodiment of the invention. The antenna assembly 40 includes a rod 42, a shield 44, and an active antenna element 46. Shield 44 and antenna element 46 are mounted atop the raised rod 42. Antenna element 46 is electrically connected to cellular device 48, via rod 42. Rod 42 may be telescopic, and is not designed to emit radiation. As shown in FIG. 3, shield 44 is disposed between antenna element 46 and the head of user 50. Thus, shield casts an electromagnetic shade 52 (delineated by perforated lines 54) over the user. Shield 44 may be tilted or geometrically shaped in consideration of the asymmetrical location of active antenna element 46 with respect to the user.

Figure 4:
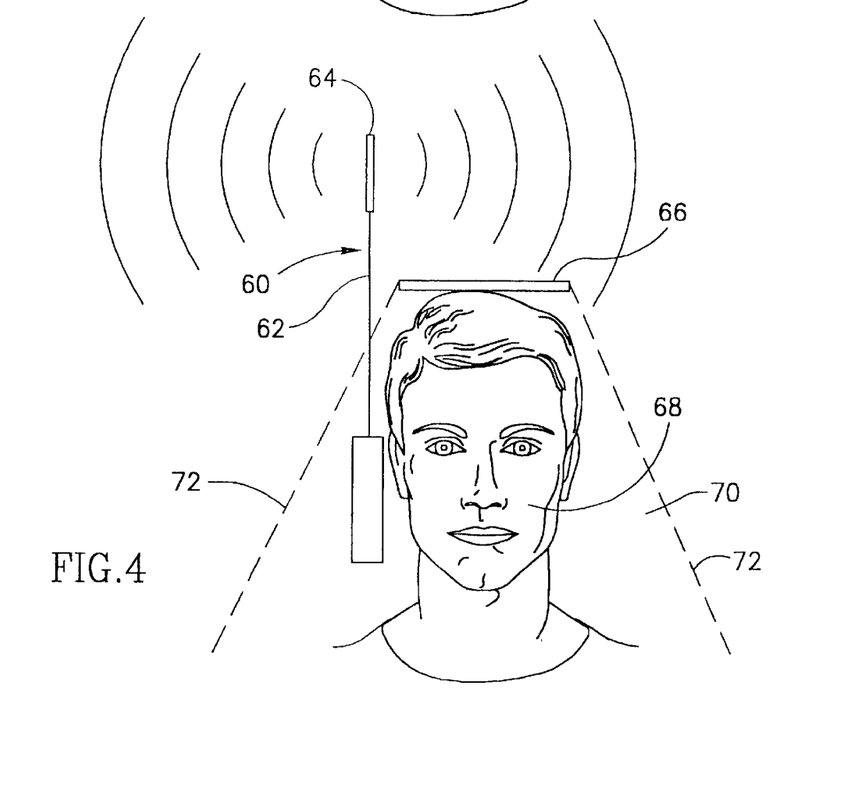
FIG. 4 is an illustration of a head of a user, an antenna assembly and a shield, constructed and operative in accordance with another preferred embodiment of the invention.

Reference is now made to FIG. 4, which is an illustration of a head of a user, an antenna assembly, generally referenced 60 and a shield, generally referenced 66, constructed and operative in accordance with another preferred embodiment of the invention. FIG. 4 presents a hybrid configuration combining the extended antenna such as in FIG. 3 and a shield such as in FIG. 2. An antenna assembly 60 includes a rod 62 and an active antenna element 64. Antenna element 64 is mounted atop the raised rod 62 and electrically connected to a cellular device 66.

As shown in FIG. 4, a shield 66 is disposed on the head of the user 68, generally below antenna element 64. Thus, the shield 66 determines an insulation zone 70 delineated by perforated lines 72, in which the user is protected from direct radiation, emitted by the antenna 64. Shield 66 may be tilted or geometrically shaped in consideration of the asymmetrical location of active antenna element 64 with respect to the head of the user 68.

Figure 5A:
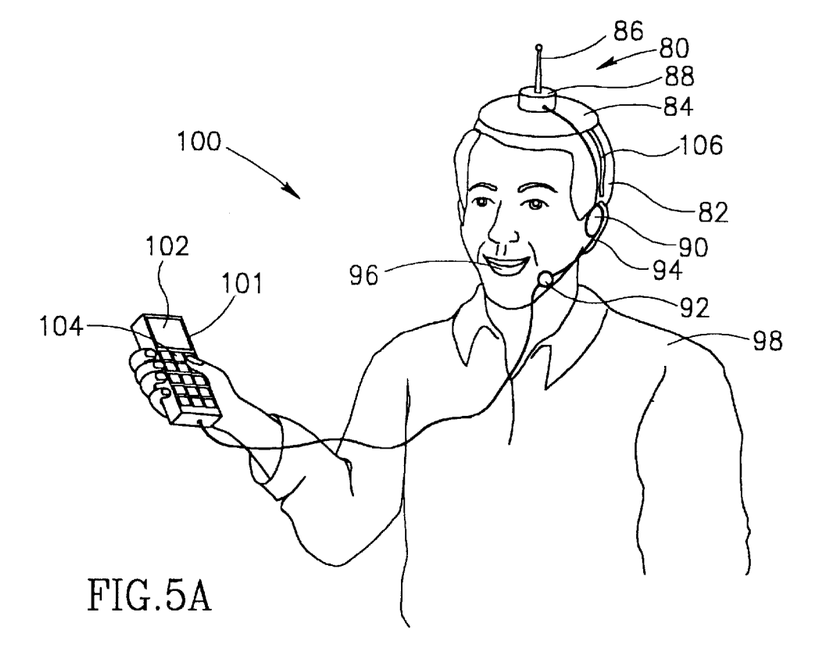
FIG. 5A is an illustration of a user with a cellular device, constructed and operative in accordance with another preferred embodiment of the invention.

According to a further aspect of the invention, certain components of a cellular telephone or radio can be disposed in the vicinity of either the shield or the antenna. Reference is now made to FIG. 5A, which is an illustration of a user with a cellular device, generally referenced 100, constructed and operative in accordance with another preferred embodiment of the invention.

Device 100 includes an assembly 80 and a user interface 101 connected thereto. Assembly 80 is attachable to the head of user 82. Assembly 80 includes a shield 84, an antenna 86 and radio circuitry 88, all of which are disposed on shield 84. Preferably, radio circuitry 88 includes transmission and reception components and a controller (not shown). The radio circuitry 88 is located adjacent to antenna 86. Assembly 80 further includes an earphone 90, and to microphone 92. Microphone 92 and earphone 90 adjacent ear 94 and mouth 96, respectively, of the user 98. Interface 101 is designed to be hand held. Interface 101 includes a visual interface 102, such as a screen display, and a tactile interface 104 such as a key pad or touch screen.

Radio circuitry 88 generates a radio signal and provides it to the antenna 86, which in turn, emits it as electromagnetic radiation. The information embedded in this radio signal can either be received from the microphone 92, from the user interface 101 or from its controller. The antenna 86 receives radio signal from a remote transmitter (not shown) and provides it to the radio circuitry 88, which extracts information, embedded therein. The controller of the radio circuitry distributes this information according to its nature. For example, audio information is provided to the earphone 90 and data information is provided to the visual interface 102.

The shield 84 is attached to the head 82 by a fastener 106. The shield 84 protects the head 82 of the user against directs radiation emitted by the antenna 86.

Figure 5B:
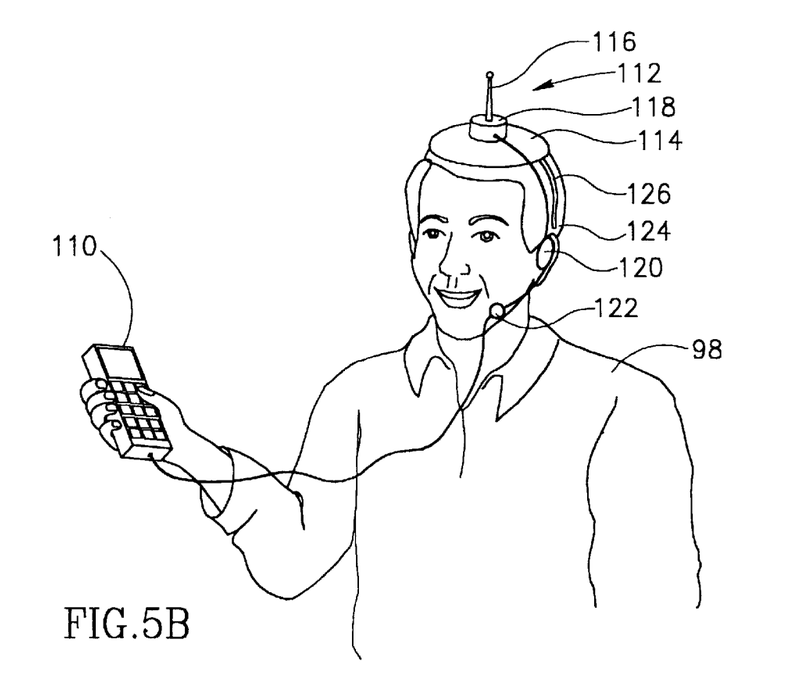
FIG. 5B is an illustration of a user, a cellular device and a head mounted device, constructed and operative in accordance with a further preferred embodiment of the invention.

Reference is now made to FIG. 5B, which is an illustration of a user, a cellular device, generally referenced 110 and a head mounted device, generally referenced 112, constructed and operative in accordance with a further preferred embodiment of the invention.

Head mounted device 112 includes a shield 114, an antenna 116 and radio circuitry 118, all of which are disposed on shield 114. Preferably, radio circuitry 118 includes transmission and reception components and a controller (not shown). The radio circuitry 118 is located adjacent to antenna 116. Head mounted device 112 further includes an earphone 120, and to microphone 122. Microphone 120 and earphone 122 are respectively located adjacent to ear and mouth of the user 124. Head mounted device 112 is connected to cellular device 110. Head mounted device 112 generally operates like a hands free operation kit, by connecting to the communication port of the cellular device 110. Radio circuitry 118 generates a radio signal and provides it to the antenna 116, which in turn emits it as electromagnetic radiation. The information embedded in this radio signal can either be received from the microphone 122 or from the cellular device 110. The antenna 116 receives radio signal from a remote transmitter (not shown) and provides it to the radio circuitry 118, which in turn provides it to the cellular device 110. The shield 114 is attached to the head 124 of the user by a fastener 126. The shield 114 protects the head 124 of the user against directs radiation emitted by the antenna 116.

It is noted that the head-mounted device 112 can include components, which correspond to various functionalities of the cellular device such as an earphone, a microphone, a final transceiver and the like. These functions are temporarily disabled in the cellular device 110, when connected to the head-mounted device 112.

Figure 6:
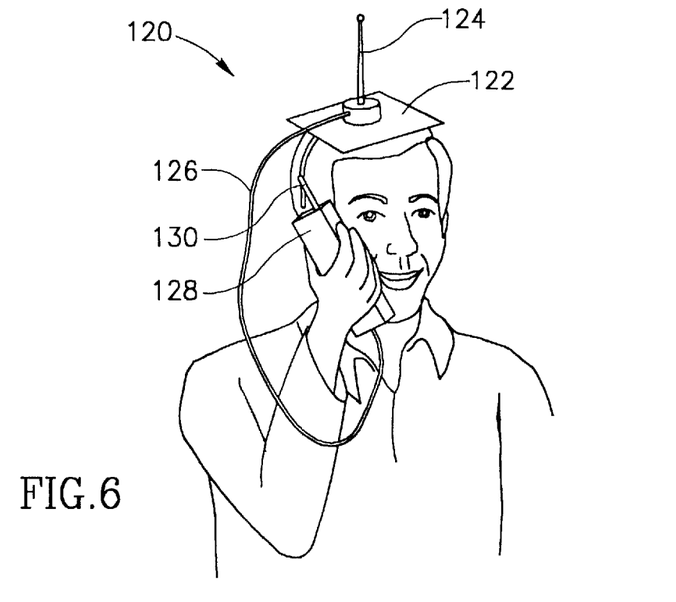
FIG. 6 is an illustrating of a user, a personal communication device and a shield assembly, constructed and operative in accordance with another preferred embodiment of the invention.

Reference is now made to FIG. 6, which is an illustrating of a user, a personal communication device 128 and a shield assembly, generally referenced 120, constructed and operative in accordance with another preferred embodiment of the invention. Shield assembly 120 includes a shield 122, an antenna 124, mounted thereon and a communication interface 126 for connecting to personal communication device 128.

The antenna 124 receives a transmission signal from the personal communication device 128 and emits a respective electromagnetic radiation signal. Shield 122 provides protection to the head of the user by blocking direct radiation emitted by antenna 124. It is noted that the personal communication device 128 includes an integral antenna 130, which is used for receiving RF communications. The physical separation between the receiving antenna and the transmitting antenna significantly reduces interference there between.

Distance from a radiating source reduces the health hazard to the user. Accordingly, it is furthermore possible to place the shield assembly 120 on a stable surface such as a table, or mount it on top of a vehicle by any fastener such as a magnet, snap fit, etc., and communicate remotely. Thereby, the user is exposed to a lower radiation level he/she would normally be exposed to, using a conventional cellular telephone without shield assembly 120.

Figure 7:
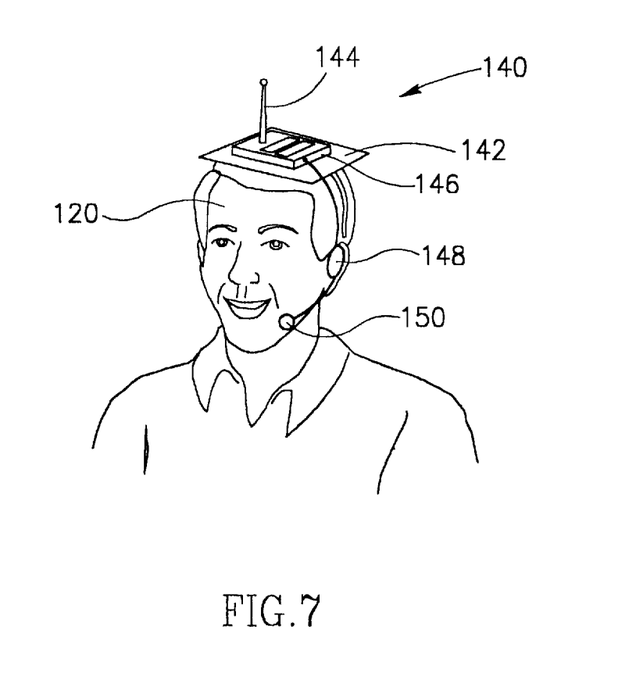
FIG. 7 is an illustration of a user and a personal communication device, constructed and operative in accordance with a further preferred embodiment of the invention.

Reference is now made to FIG. 7, which is an illustration of a user and a personal communication device, generally referenced 140, constructed and operative in accordance with a further preferred embodiment of the invention.

Personal communication device 140 includes a shield 142, an antenna 144 and electronic circuitry 146. The antenna 142 and the electronic circuitry 146 are connected there between and attached to the shield 142. The shield 142 is disposed above the head of the user. It is noted that the antenna 144 is located above the shield 142. Hence, shield 142 provides protection to the head of the user by blocking direct radiation emitted by antenna 144. Electronic circuitry 146 includes any element, which is used either to transmit or receive communication via the antenna 144, as well as user interface components, such as an earphone 148 and a microphone 150. It is noted that the electronic circuitry 146 can be placed on the shield 142, underneath the shield 142 or in the shield 142.

Figure 8:
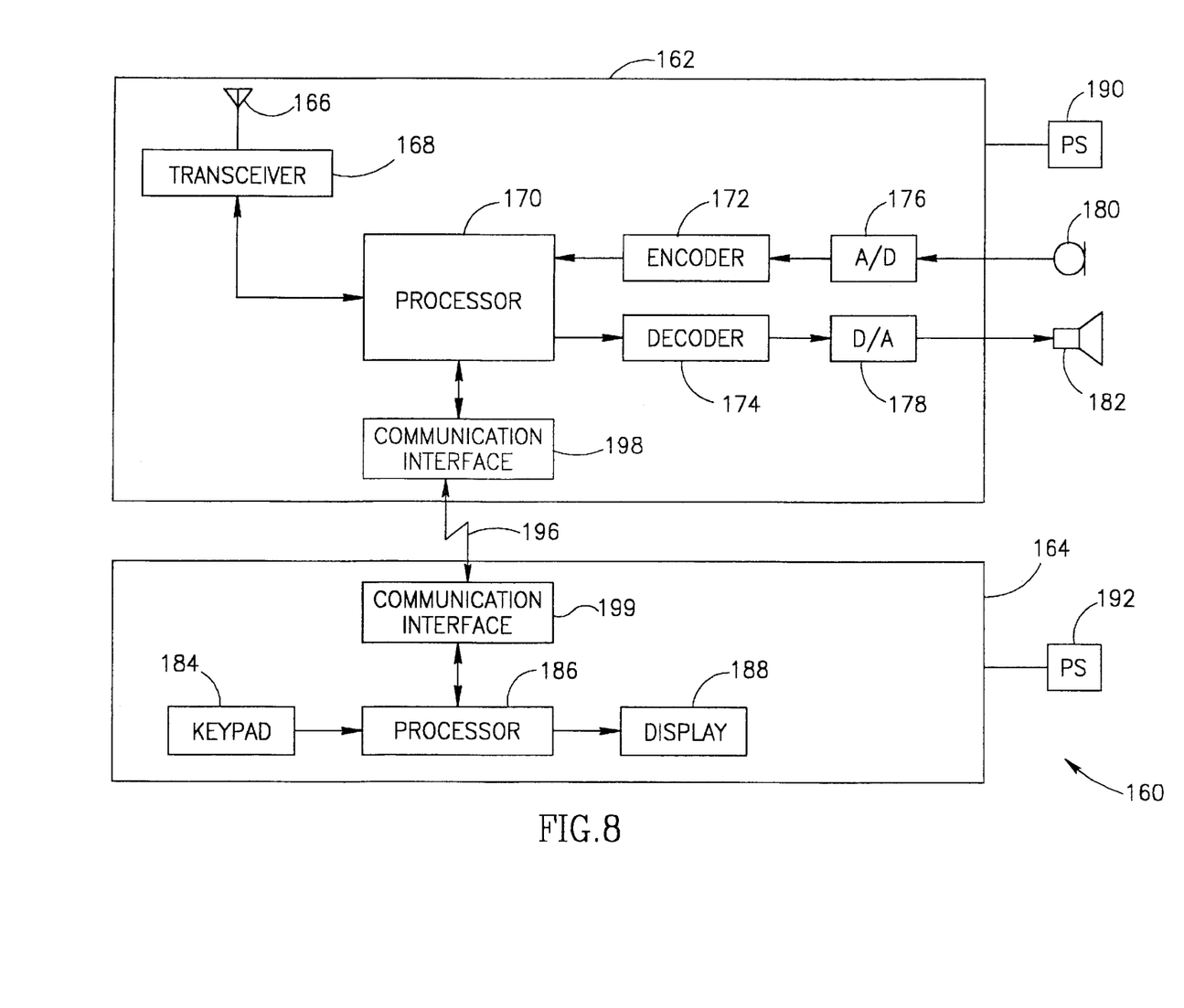
FIG. 8 is a schematic illustration in detail of shielded personal communication device, constructed and operative in accordance with a further preferred embodiment of the invention.

Reference is now made to FIG. 8, which is a schematic illustration in detail of shielded personal communication device, generally referenced 160, constructed and operative in accordance with a further preferred embodiment of the invention.

Shielded device 160 includes a head mounted unit 162 and a hand held unit 164. The head mounted unit 164 includes an antenna 166, a transceiver 168, a processor 170, an encoder 172, a decoder 174, an analog to digital (A/D) converter 176, a digital to analog (D/A) converter 178 and a communication interface 198. Transceiver 168 is connected to antenna 166 and to processor 170. Encoder 172 is connected between A/D converter 176 and processor 170. Decoder 174 is connected between D/A converter 178 and processor 170. Processor 170 is further connected to communication interface 198. Head mounted unit 162 is further connected to a power supply 190, which for example, can include a battery.

Hand held unit 164 includes a keypad 184, a processor 186, a display 188 and a communication interface 199. The processor 186 is connected to keypad 184, display 188 and to communication interface 199. Communication interfaces 198 and 199 are interconnected via link 196. It is noted that communication interfaces 198 and 199 can be either wired or wireless, thereby defining the nature of link 196, as either wired or wireless. It is further noted that such a wireless link can be RF, infrared or ultrasound.

A/D converter 176 is further connected to a microphone 180. D/A converter 178 is further connected to an earphone 182. Hand held unit 164 can be further connected to a power supply 192. Alternatively, the head-mounted unit 162 can provide power supply to the hand held unit 164. It is noted that a power supply unit, utilized by the shielded personal communication device 160, can be physically located in either one of the units 162 and 164, providing power to both units, via a link 196 there between, where link 196 is a wire type link. It is noted that a shield (not shown) is disposed between antenna 166 and the head of the user.

Figure 9:
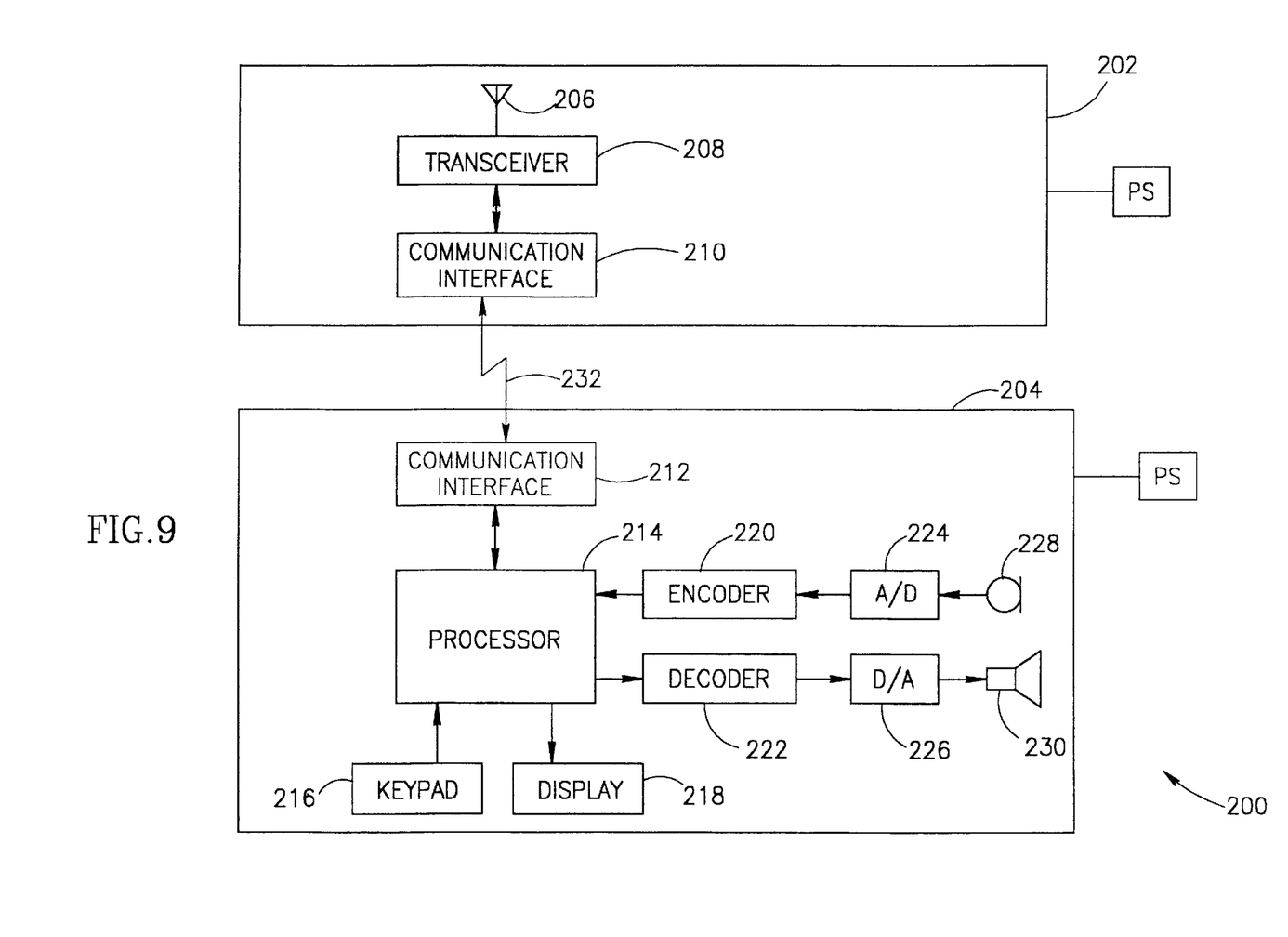
FIG. 9 is a schematic illustration in detail of shielded personal communication device, constructed and operative in accordance with another preferred embodiment of the invention.

Reference is now made to FIG. 9, which is a schematic illustration in detail of shielded personal communication device, generally referenced 200, constructed and operative in accordance with another preferred embodiment of the invention.

Shielded device 200 includes a head mounted unit 202 and a hand held unit 204. The head-mounted unit 204 includes an antenna 206, a transceiver 208 and a communication interface 210. The transceiver 208 is connected between the antenna 206 and the communication interface 210.

Hand held unit 204 includes a communication interface 212, a processor 214, a keypad 216, a display 218, an encoder 220, a decoder 222, an A/D converter 224, a D/A converter 226 a microphone 228 and an earphone 230. Processor 214 is connected to communication interface 212, keypad 216, a display 218, encoder 220, and to decoder 222. A/D converter 224 is connected between encoder 220 and microphone 228. D/A converter 226 is connected between decoder 222 and earphone 230. Communication interfaces 210 and 212 are connected there between via a link 232. It is noted that communication interfaces 210 and 212 can be either wired or wireless, thereby defining the nature of link 232, as either wired or wireless. It is further noted that such a wireless link can be RF, infrared or ultrasound.

The device 200 provides a structure in which the high power consuming function of transmitting an RF signal, is entirely located within the head mounted unit 202, while all other functions are located within the hand held unit 204.

Figure 10:
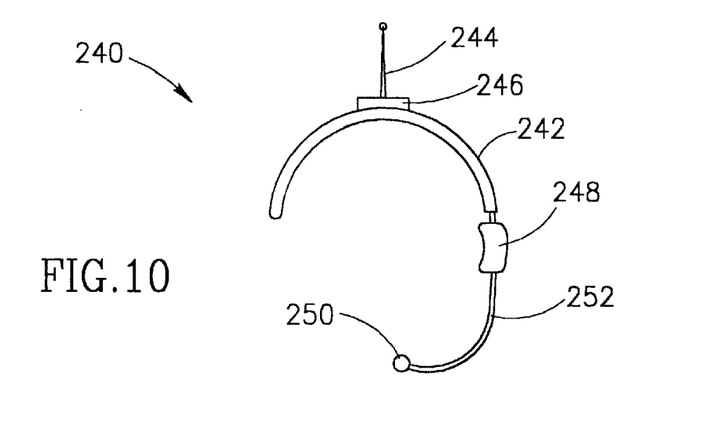
FIG. 10 is an illustration of a frontal view of a head set, constructed and operative in accordance with another preferred embodiment of the present invention.

Reference is now made to FIG. 10, which is an illustration of a frontal view of a head set, generally referenced 240, constructed and operative in accordance with another preferred embodiment of the present invention. Headset 140 includes a shield 242, an antenna 244, transceiver circuitry 246, an earphone 248 and a microphone 250. Earphone 248, microphone 250 and antenna 244 are connected to transceiver circuitry 246. Earphone 248 and microphone 250 are mounted on an arc 252, which places them in the respective locations with regard to the ear and mouth of a user. The antenna 244 is located above the shield 242.

A device according to the present invention can incorporated with any head related element, such as a hat, a hair piece, spectacle frame and the like, as will be described herein below.

Figure 11A:
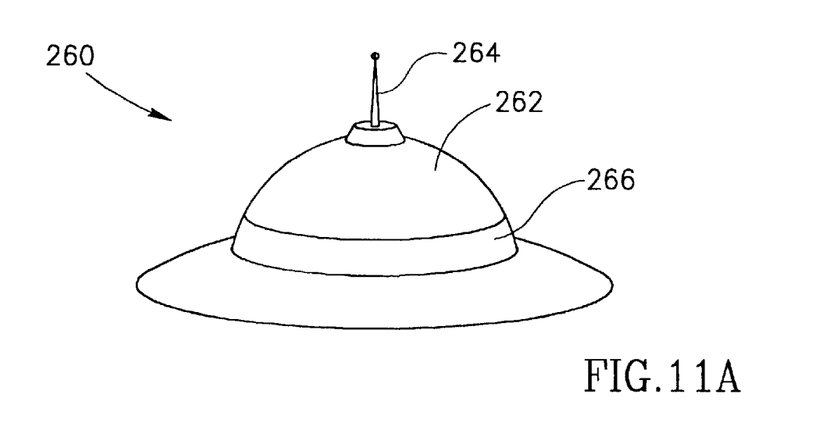
FIG. 11A is an illustration, in a perspective view, of a device incorporated with a hat.

Reference is now made FIGS. 11A, 11B, 11C, 11D, 11E, 11F and 11G. FIG. 11A is an illustration, in a perspective view, of a device, generally referenced 260, incorporated with a hat, generally referenced 266, constructed and operative in accordance with another preferred embodiment of the present invention. The shield 262 is located within or onto the hat, while the antenna 264 is located on top of the hat 266, above the shield 262. Hat 266 can be formed by a variety of shapes, including, among others, a cylinder, a cap, a yarmulke, and so forth.

Figure 11B:
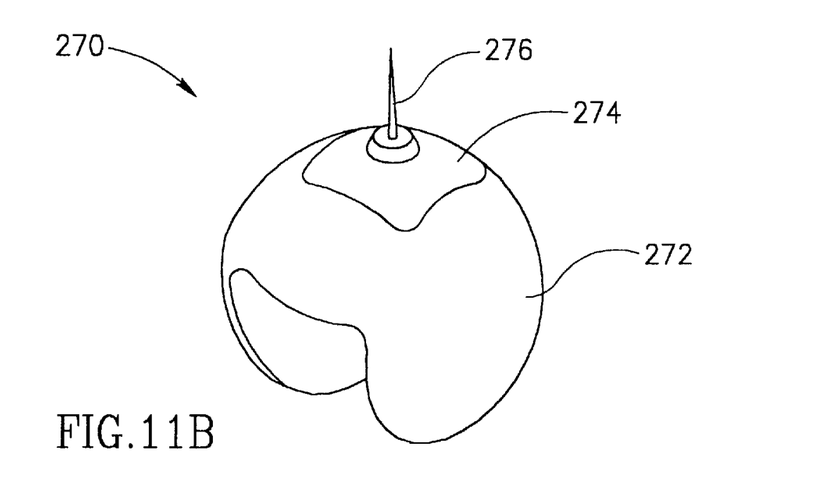
FIG. 11B is an illustration, in a perspective view, of a device incorporated with a helmet.

FIG. 11B is an illustration, in a perspective view, of a device, generally referenced 270, incorporated with a helmet, generally referenced 272, constructed and operative in accordance with a further preferred embodiment of the present invention. The shield 274 can be located either within the helmet 272 or on top of it. The antenna 276 is located on top of the helmet 272, above the shield 274.

Figure 11C:
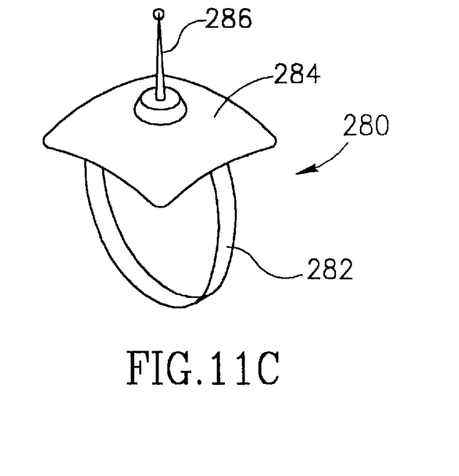
FIG. 11C is an illustration, in a perspective view, of a device incorporated with a harness.

FIG. 11C is an illustration, in a perspective view, of a device, generally referenced 280, incorporated with a harness, generally referenced 282, constructed and operative in accordance with another preferred embodiment of the present invention. The shield 284 can be located either below the harness 282 or on top of it or connected thereto, so long it is located between the antenna 286 and the head of the user. The antenna 286 is located on top of the harness 282, above the shield 284.

Figure 11D:
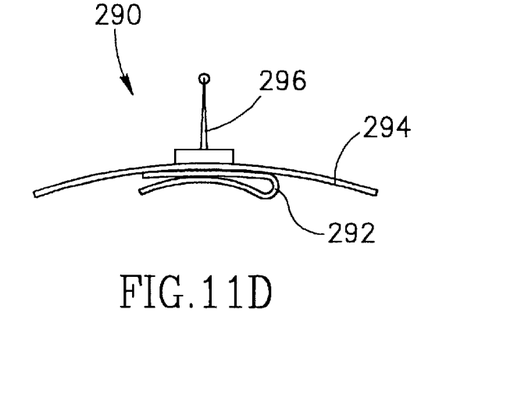
FIG. 11D is an illustration, in a cross-sectional view, of a device incorporated with a hairpin.

FIG. 11D is an illustration, in a cross-sectional view, of a device, generally referenced 290, incorporated with a hairpin, generally referenced 292, constructed and operative in accordance with a further preferred embodiment of the present invention. The shield 294 is attached to hairpin 292. The antenna 296 is located on top of the shield 294.

Figures 11E, 11F:
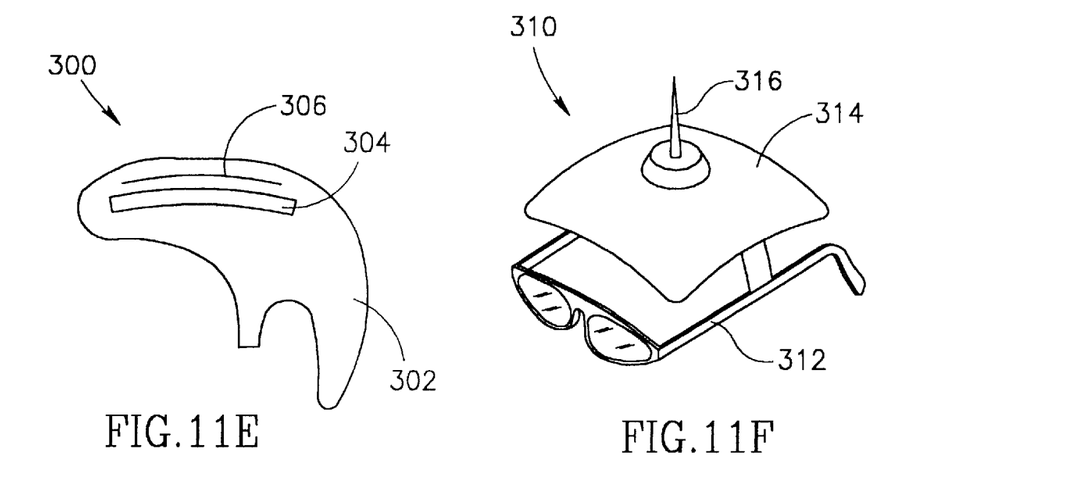
FIG. 11E is an illustration, in a cross-sectional view, of a device incorporated with a hairpiece.
FIG. 11F is an illustration, in a perspective view, of a device incorporated with a visor.
Figure 11G:
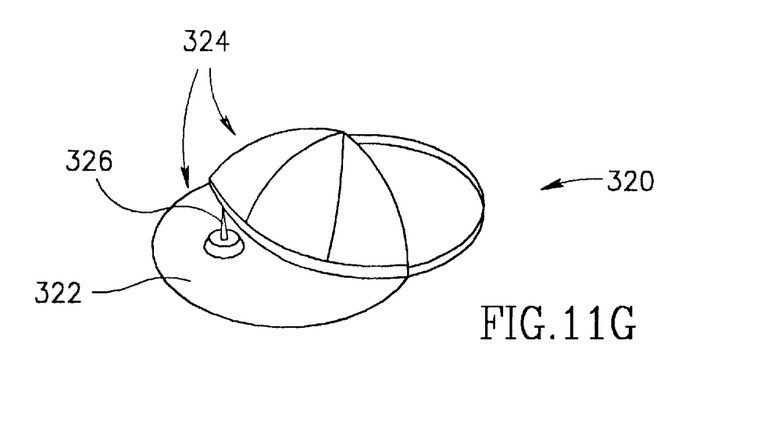

FIG. 11E is an illustration, in a cross-sectional view, of a device, generally referenced 300, incorporated with a hairpiece, generally referenced 302, constructed and operative in accordance with another preferred embodiment of the present invention. The shield 304 can be located either within the hairpiece 302 or on top of it. The antenna 306 is located on top of the hairpiece 302, above the shield 304. Antenna 306 may be formed as a horizontally disposed rod or generally flat shaped, allowing concealment thereof in hairpiece 302.

FIG. 11F is an illustration, in a perspective view, of a device, generally referenced 310, incorporated with a visor, generally referenced 322, constructed and operative in accordance with another preferred embodiment of the present invention. The shield 324 can be either integrated with or mounted on visor 322, so long it is located between the antenna 326 and the head of the user. The antenna 326 is located, above the shield 324.

Figure 12A:
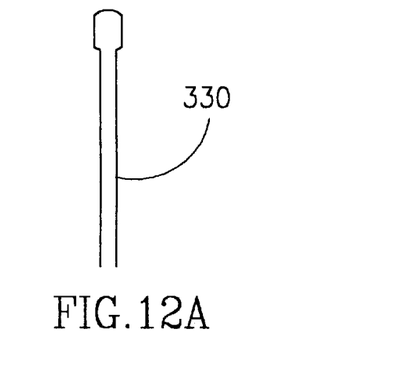
In FIG. 12A there is shown a rod shaped antenna adapted for its vertical disposition.
Figure 12B:
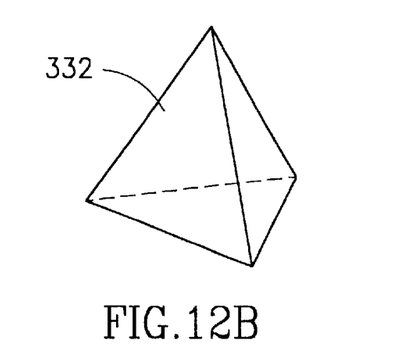
FIG. 12B shows a pyramid shaped antenna. The Antenna in FIG. 12C is cone shaped.
Figure 12C:
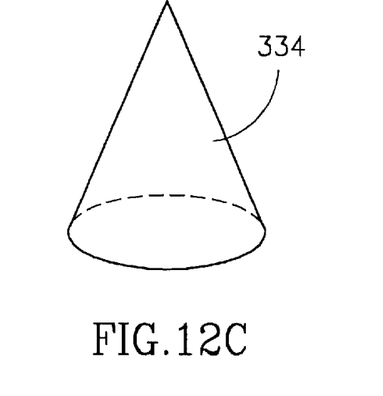
Figure 12D:
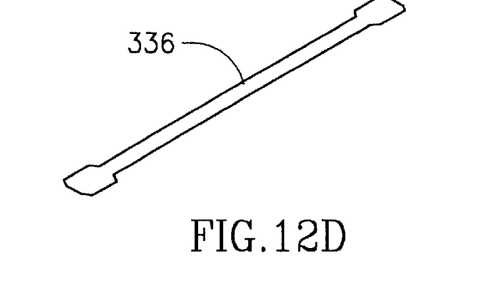
FIG. 12D shows a rod shaped antenna adapted for its horizontal disposition.
Figure 12E:
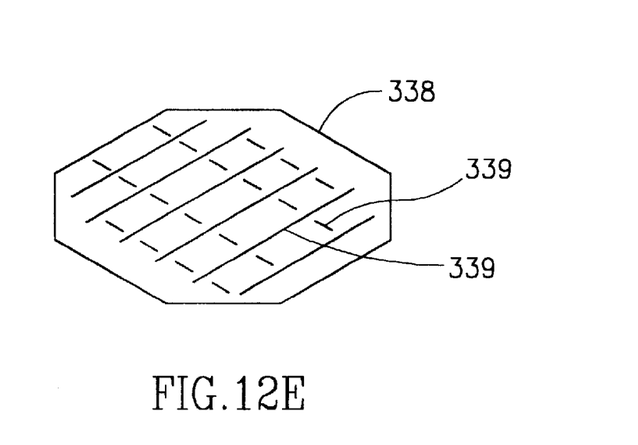
In FIG. 12E there is shown a flat shaped antenna adapted for its horizontal disposition.

Reference is now made FIGS. 12A, 12B, 12C, 12D, and 12E, illustrating, in perspective view, several antennas constructed and operative in conjunction with preferred embodiments of the present invention. Antenna 330 in FIG. 12A is rod shaped adapted for its vertical disposition. Antenna 332 in FIG. 12B is pyramid shaped. Antenna 334 in FIG. 12C is cone shaped. Antenna 336 in FIG. 12D is rod shaped adapted for its horizontal disposition. Antenna 338 in FIG. 12E is flat shaped adapted for its horizontal disposition. Antenna 338 can be designed to emit electromagnetic radiation in its entirety, or incorporate radiation emitting elements 340 embedded therein.

Figure 13A:
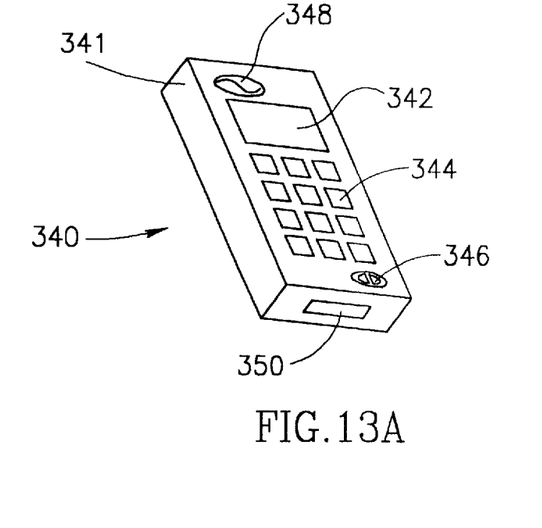
FIGS. 13A and 13B illustrate, in perspective view, two user interface units constructed and operative in conjunction with preferred embodiments of the present invention.
Figure 13B:
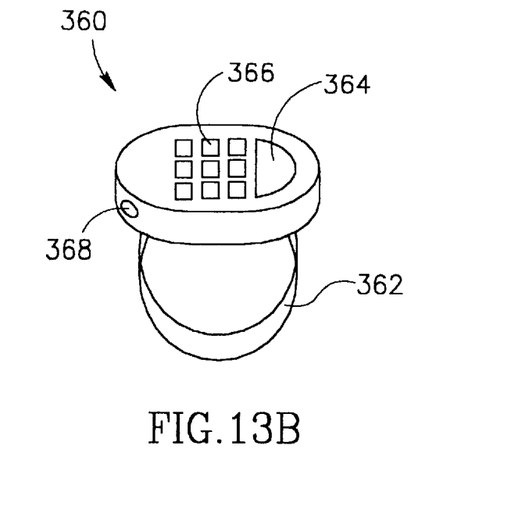

Reference is now made FIGS. 13A and 13B, illustrating, in perspective view, two user interface units constructed and operative in conjunction with preferred embodiments of the present invention. User interface unit 340 in FIG. 13A includes a hand held frame 341, a display 342, a keypad 344, a microphone 346, a speaker 348 and communication interface 350. Communication interface 350 wires or wirelessly connects user interface unit 340 to the transmission antenna (not shown) which is disposed on the head of the used.

User interface unit 360 in FIG. 13B is wrist worn unit featuring a wristband 362 affixing unit 360 to the hand of the user. Unit 360 includes a display 364, a keypad 346 and communication interface 368. Communication interface 368 wires or wirelessly connects user interface unit 360 to the transmission antenna (not shown) which is disposed on the head of the used. It will be noted that the user is able to communicate hands-free with unit 360.

Figure 14A:
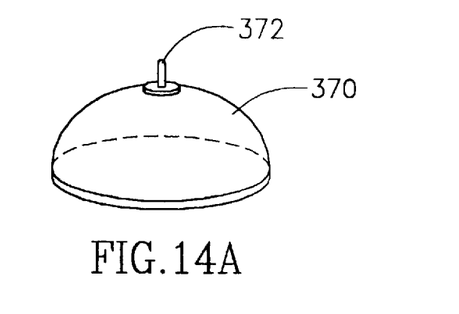
FIG. 14A illustrates a convex shield.
Figure 14B:
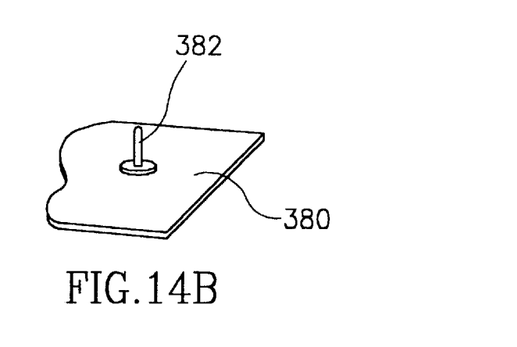
FIG. 14B illustrates a substantially flat shield.
Figure 14C:
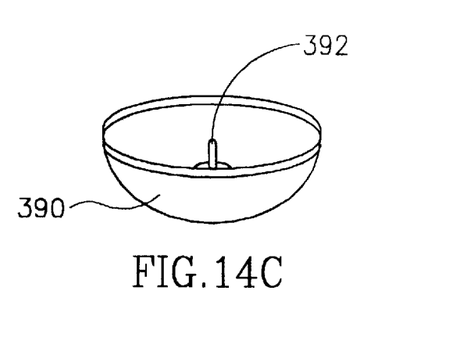
FIG. 14C illustrates a concave shield.

Reference is now made FIGS. 14A, 14B and 14C, illustrating, in perspective view, three shields constructed and operative in conjunction with preferred embodiments of the present invention. FIG. 14A illustrates a convex shield 370 above which antenna 372 is mounted. Convex shield 370 may be matched to wrap, at least partially, the skull of the user. FIG. 14B illustrates a substantially flat shield 380 above which antenna 382 is mounted. Flat shield 380 is particularly adapted to be place on flat surfaces as explained with respect to FIG. 6. FIG. 14C illustrates a concave shield 390 above which antenna 392 is mounted. Concave shield 390 can provide an enhanced shading protection of the user from direct radiation emitted by antenna 392, and narrow the radiation beam of antenna 392.

Figure 15:
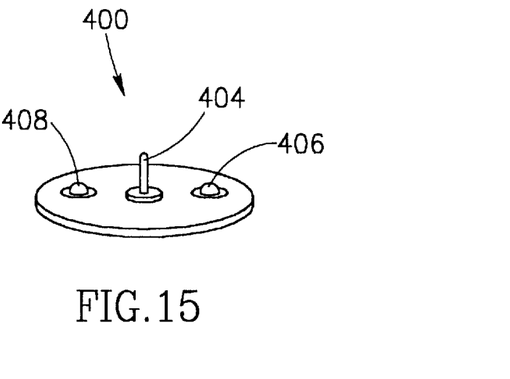
FIG. 15 illustrates, in a perspective view, a shield assembly, constructed and operative in accordance with a preferred embodiment of the invention.

Reference is now made to FIG. 15 illustrating, in a perspective view, a shield assembly, generally designated 400, that is constructed and operative in accordance with a preferred embodiment of the invention. Assembly 400 includes a shield 402, an antenna 404, and visual signals 406 and 408. Signals 406 and 408 include two light sources that can be of different colors, respectively. Different on and off modes of the light sources, and combinations thereof, indicate to the people nearby, according to a predetermined signaling code, whether a radio device employed with assembly 400 is in operating mode, standby mode, or turned off.

While the invention has been described with respect to specific embodiments, it will be appreciated that many variations, modifications and other applications of the invention may be made.

With the foregoing description, it is believed apparent that the present invention enables the attainment of the objects initially set forth herein.

It should be understood, however, that the invention is not intended to be limited to the specifics of the illustrated or described embodiments or methods, but rather is defined by the accompanying claims.

I claim:

1. Head-mounted wearable shielded antenna apparatus for connecting to a personal radio transmitting device for shielding a user's head from RF emissions, the head-mounted wearable shielded antenna apparatus comprising:

a shield adapted to be placed on the user's head;

an antenna mounted on said shield and configured to emit said RF emissions; and a communication interface for communicating said antenna to said personal radio transmitting device;

wherein said shield is adapted to be disposed between said antenna and the user's head, and only partially physically cover the user's head to an extent sufficient to at least substantially entirely shield the user's head from a path of said RF emissions emitted by said antenna.

2. The head-mounted wearable shielded antenna apparatus according to claim 1, further comprising a shield support for supporting said shield on the head of said user.

3. The head-mounted wearable shielded antenna apparatus according to claim 2, wherein said shield support is selected from a list consisting of:
- a headset;
- a hat;
- a helmet;
- a harness;
- a hair pin;
- a hairpiece;
- a spectacle frame; and
- a visor.

4. The apparatus of claim 2, wherein said shield support is formed separately from said shield.

5. The apparatus of claim 2, wherein said shield support is not configured to shield the user's head from said RF emissions emitted by said antenna.

6. The head-mounted wearable shielded antenna apparatus according to claim 1, wherein the shape of said antenna is selected from a list consisting of:
- a rod;
- a pyramid;
- a cone;
- a curved plane; and
- a flat plane.

7. The head-mounted wearable shielded antenna apparatus according to claim 1, wherein the shape of said shield is selected from the list consisting of:
- a substantially convex shape;
- a substantially concave shape; and
- a substantially flat shape.

8. The head-mounted wearable shielded antenna apparatus according to claim 1, wherein said shield is an integral part of an item selected from the list consisting of:
- a headset;
- a hat;
- a helmet;
- a harness;
- a hair pin;
- a hairpiece;
- a spectacle frame; and
- a visor.

9. The head-mounted wearable shielded antenna apparatus according to claim 1, further comprising a radio communication component, connected to said antenna, for transmitting or receiving of radio transmissions conducted via said antenna.

10. The head-mounted wearable shielded antenna apparatus according to claim 9, wherein said radio communication component is disposed adjacent to said antenna.

11. The head-mounted wearable shielded antenna apparatus according to claim 9, further comprising a power source for supplying power to said radio communication component.

12. The head-mounted wearable shielded antenna apparatus according to claim 11, wherein said power source is disposed adjacent to said radio communication component.

13. The head-mounted wearable shielded antenna apparatus according to claim 9, wherein said radio communication component is selected from the list consisting of:
- a transmitter;
- a receiver; and
- a transceiver.

14. The head-mounted wearable shielded antenna apparatus according to claim 9, further comprising a processor, connected to said radio communication component and to said communication interface, for controlling said radio communication component.

15. The head-mounted wearable shielded antenna apparatus according to claim 14, wherein said processor is disposed adjacent to said radio communication component.

16. The head-mounted wearable shielded antenna apparatus according to claim 14, further comprising a user interface in communication with said processor.

17. The head-mounted wearable shielded antenna apparatus according to claim 16, wherein said user interface is selected from the list consisting of:
- a display screen;
- a keypad;
- a touch-screen;
- a microphone; and
- an earphone.

18. The head-mounted wearable shielded antenna apparatus according to claim 1, further comprising a visual indicator, for indicating to people in the vicinity of said user, the operation-state of said personal radio transmitting device.

19. The head-mounted wearable shielded antenna apparatus according to claim 18, wherein said operation-state includes said head-mounted wearable shielded antenna apparatus being in a state selected from the list consisting of:
- in use;
- in standby mode; and
- turned off.

20. A head-mounted wearable shielded personal communication device for, at least, transmitting RF emissions and shielding a user's head from said RF emissions, said head-mounted wearable shielded personal communication device comprising:
- a shield adapted to be placed on the user's head;
- an antenna mounted on said shield and configured to at least emit said RF emissions; and
- a radio circuitry physically disposed on top and outside of said shield and communicated with said antenna;
- wherein said shield is adapted to be disposed between said antenna and the user's head to shield the user's head from said RF emissions emitted by said antenna.

21. The head-mounted personal communication device according to claim 20, further comprising a shield support for supporting said shield between the head of said user and said antenna.

22. The head-mounted personal communication device according to claim 21, wherein said shield support is selected from a list consisting of:
- a headset;
- a hat;
- a helmet;
- a harness;
- a hair pin;
- a hairpiece;

a spectacle frame; and a visor.

23. The head-mounted personal communication device according to claim 20, wherein the shape of said antenna is selected from a list consisting of:
   a rod;
   a pyramid;
   a cone;
   a curved plane; and
   a flat plane.

24. The head-mounted personal communication device according to claim 20, wherein the shape of said shield is selected from the list consisting of:
   a substantially convex shape;
   a substantially concave shape; and
   a substantially flat shape.

25. The head-mounted personal communication device according to claim 20, wherein said shield is an integral part of an item selected from the list consisting of:
   a headset;
   a hat;
   a helmet;
   a harness;
   a hair pin;
   a hairpiece;
   a spectacle frame; and
   a visor.

26. The head-mounted personal communication device according to claim 25, wherein the type of said hat is selected from the list consisting of:
   a cylinder;
   a cap; and
   a yarmulke.

27. The head-mounted personal communication device according to claim 20, further comprising a radio communication component, connected to said antenna, for transmitting or receiving of radio transmissions conducted via said antenna.

28. The head-mounted personal communication device according to claim 27, wherein said radio communication component is disposed adjacent to said antenna.

29. The head-mounted personal communication device according to claim 27, further comprising a power source for supplying power to said radio communication component.

30. The head-mounted personal communication device according to claim 29, wherein said power source is disposed adjacent to said radio communication component.

31. The head-mounted personal communication device according to claim 27, wherein said radio communication component is selected from the list consisting of:
   a transmitter;
   a receiver; and
   a transceiver.

32. The head-mounted personal communication device according to claim 27, further comprising a processor, connected to said radio communication component and to said communication interface, for controlling said radio communication component.

33. The head-mounted personal communication device according to claim 32, wherein said processor is disposed adjacent to said radio communication component.

34. The head-mounted personal communication device according to claim 32, further comprising a user interface in communication with said processor.

35. The head-mounted personal communication device according to claim 33, wherein said user interface is selected from the list consisting of:
   a display screen;
   a keypad;
   a touch-screen;
   a microphone; and
   an earphone.

36. The head-mounted personal communication device according to claim 20, further comprising a visual indicator, for indicating to people in the vicinity of said user, an operation state of said personal communication device.

37. The head-mounted personal communication device according to claim 36, wherein said operation state includes said personal communication device being in a state selected from the list consisting of:
   in use;
   in standby mode; and
   turned off.

38. A personal communication device, comprising:
   a head-mounted unit including a shield adapted to be placed on a user's head, an antenna mounted on said shield, and a radio circuitry communicated to said antenna, wherein said shield is adapted to be disposed between said antenna and the user's head to shield the user's head from RF emissions emitted by said antenna;
   a remote unit physically remote from said head-mounted unit and including a user interface; and
   a link for communicating said head-mounted unit with said remote unit.

39. The device of claim 38, wherein said user interface includes at least one of a display and a key pad.

40. The device of claim 38, wherein said remote unit is a cellular device having at least one of a transceiver, a microphone, and an earphone.

41. The device of claim 40, wherein said at least one of the transceiver, microphone, and earphone is disabled when said link is activated.

42. The device of claim 38, wherein said remote unit further includes a receiving antenna, and said antenna of said head-mounted unit is configured to exclusively transmit said RF emissions.

43. The device of claim 38, wherein said link is a wireless link configured exclusively for signal communication between said head-mounted unit and said remote unit.

44. The device of claim 38, wherein said link is a wired link configured for both signal communication and power supply between said head-mounted unit and said remote unit.

45. The device of claim 38, wherein said radio circuitry of said head-mounted unit includes a transceiver.

46. The device of claim 45, wherein said radio circuitry of said head-mounted unit further includes a processor coupled to and for controlling said transceiver.

47. The device of claim 46, wherein said radio circuitry of said head-mounted unit further includes a voice interface coupled to said processor.

48. The device of claim 46, wherein said remote unit further includes a processor coupled to and for controlling said transceiver of said head-mounted unit via said link.

49. The device of claim 48, wherein said remote unit further includes a voice interface coupled to said processor.

50. The device of claim 38, wherein said remote unit comprises a hand-held unit.

51. The device of claim 38, wherein said remote unit comprises a finger-mounted unit.

52. A head-mounted wearable shielded antenna apparatus for connecting to a personal radio transmitting device for shielding a user's head from RF emissions, the head-mounted wearable shielded antenna apparatus comprising:
   a shield adapted to be placed on the user's head;
   an antenna mounted on said shield and configured to emit said RF emissions; and
   a communication interface for communicating said antenna to said personal radio transmitting device;
   wherein said shield is adapted to be disposed between said antenna and the user's head to shield the user's head from said RF emissions emitted by said antenna; and
   wherein said shield includes a RF signal reflective surface facing said antenna.

53. The device of claim 52, wherein said reflective surface is roughened.

54. A head-mounted wearable shielded antenna apparatus for connecting to a personal radio transmitting device for shielding the user's head from RF emissions, the head-mounted wearable shielded antenna apparatus comprising:
   a shield adapted to be placed on the user's head;
   a shield support adapted to support said shield on the user's head;
   an antenna mounted on one of said shield and said shield support, and configured to emit said RF emissions; and
   a communication interface for communicating said antenna to said personal radio transmitting device;
   wherein said shield is adapted to be disposed between said antenna and the user's head to shield the user's head from said RF emissions emitted by said antenna; and
   wherein said shield support is not a portion of a helmet.

55. A head-mounted wearable shielded personal communication device for, at least, transmitting RF emissions and shielding a user's head from said RF emissions, said head-mounted wearable shielded personal communication device comprising:
   a shield adapted to be placed on the user's head;
   an antenna mounted on said shield and configured to at least emit said RF emissions; and
   a radio circuitry communicated with said antenna;
   wherein said shield is adapted to be disposed between said antenna and the user's head, and only partially physically cover the user's head to an extent sufficient to at least substantially entirely shield the user's head from said RF emissions emitted by said antenna.

56. A method of shielding a user's head from RF emissions emitted by a personal communication device, comprising the steps of
   mounting an antenna on a shield;
   supporting said shield on the user's head so that said shield only partially physically covers the user's head to an extent sufficient to at least substantially entirely shield the user's head from said RF emissions emitted by said antenna;
   communicating said antenna to said personal communication device; and
   using said antenna, at least, as a transmitting antenna for said personal communication device.

* * * * *